United States Patent
Cordes et al.

(10) Patent No.: US 9,460,573 B1
(45) Date of Patent: Oct. 4, 2016

(54) AUTONOMOUS AUTHENTICATION OF A READER BY A RADIO FREQUENCY IDENTITY (RFID) DEVICE

(71) Applicant: Sprint Communications Company L.P., Overland Park, KS (US)

(72) Inventors: Kevin R. Cordes, Lee's Summit, MO (US); Clinton H. Loman, Raymore, MO (US); Lyle W. Paczkowski, Mission Hills, KS (US); Kenneth R. Steele, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 291 days.

(21) Appl. No.: 14/192,316

(22) Filed: Feb. 27, 2014

(51) Int. Cl.
G05B 19/00 (2006.01)
G08B 13/14 (2006.01)
H04Q 5/22 (2006.01)
G06F 21/35 (2013.01)
G07C 9/00 (2006.01)

(52) U.S. Cl.
CPC .................................. *G07C 9/00111* (2013.01)

(58) Field of Classification Search
CPC ........ G05B 19/00; G08B 13/14; H04Q 5/22; G06Q 30/00
USPC ..................... 340/10.1, 5.6, 5.61, 5.62, 5.63; 705/26.3
See application file for complete search history.

(56) References Cited

U.S. PATENT DOCUMENTS

| | | | |
|---|---|---|---|
| 6,177,860 B1 | 1/2001 | Cromer et al. | |
| 7,245,213 B1 * | 7/2007 | Esterberg | H04L 63/0428 235/382 |
| 7,366,806 B2 | 4/2008 | Milenkovic et al. | |
| 7,450,010 B1 * | 11/2008 | Gravelle | G06F 21/606 340/10.1 |
| 7,834,743 B2 | 11/2010 | Nagata et al. | |
| 7,924,156 B2 | 4/2011 | Colby | |
| 8,138,922 B2 | 3/2012 | Lindsay et al. | |
| 8,174,384 B2 | 5/2012 | Stagg | |
| 8,217,793 B2 * | 7/2012 | Broer | G06K 7/0008 340/572.1 |
| 8,311,509 B2 | 11/2012 | Feher | |
| 8,471,708 B1 * | 6/2013 | Diorio | G06K 7/10009 340/10.2 |
| 8,487,769 B2 | 7/2013 | Lindsay et al. | |
| 8,718,554 B2 | 5/2014 | Abel | |

(Continued)

OTHER PUBLICATIONS

Loman, Clint H., et al., "Radio Frequency Induced Power Reception Management for a Radio Frequency Identity (RFID) Chip Embedded in a Mobile Communication Device," filed Nov. 4, 2014, U.S. Appl. No. 14/532,954.

(Continued)

*Primary Examiner* — Nam V Nguyen

(57) ABSTRACT

A radio frequency identity (RFID) tag. The tag comprises a processor, a memory, wherein the memory stores private information and public information, and a radio transceiver configured to receive a request for information from an RFID reader and to transmit a reply to the request for information. The tag further comprises an application stored in the memory that, when executed by the processor, parses a request for information from the RFID reader received by the radio transceiver, and determines whether the RFID reader is authorized to receive the private information. When the RFID reader is determined to be authorized, the application reads the private information from the memory and sends the private information to the radio transceiver to transmit; when the RFID reader is determined to not be authorized, the application reads the public information and sends the public information to the radio transceiver to transmit.

16 Claims, 8 Drawing Sheets

(56) References Cited

U.S. PATENT DOCUMENTS

| | | | |
|---|---|---|---|
| 8,797,144 B2* | 8/2014 | Hinman | G06K 7/10267 340/10.1 |
| 8,811,971 B2 | 8/2014 | Corda et al. | |
| 8,816,826 B2 | 8/2014 | Colby | |
| 8,866,594 B1* | 10/2014 | Diorio | G06K 7/10297 340/10.42 |
| 9,087,318 B1 | 7/2015 | Cordes et al. | |
| 9,171,243 B1 | 10/2015 | Cordes et al. | |
| 9,286,594 B1 | 3/2016 | Cordes et al. | |
| 9,324,016 B1 | 4/2016 | Cordes et al. | |
| 2005/0045719 A1 | 3/2005 | Yang | |
| 2005/0123596 A1 | 6/2005 | Kohane et al. | |
| 2005/0125396 A1 | 6/2005 | Liu | |
| 2006/0258289 A1 | 11/2006 | Dua | |
| 2007/0035381 A1* | 2/2007 | Davis | G06K 19/0723 340/10.1 |
| 2007/0069852 A1* | 3/2007 | Mo | H04L 9/3271 340/5.1 |
| 2007/0075140 A1 | 4/2007 | Guez et al. | |
| 2008/0051142 A1 | 2/2008 | Calvet et al. | |
| 2008/0198098 A1 | 8/2008 | Gelbman et al. | |
| 2008/0232259 A1 | 9/2008 | Thomson | |
| 2008/0303637 A1 | 12/2008 | Gelbman et al. | |
| 2009/0164800 A1 | 6/2009 | Johansson et al. | |
| 2009/0227290 A1 | 9/2009 | Chien | |
| 2010/0075669 A1 | 3/2010 | Sparks et al. | |
| 2011/0063093 A1 | 3/2011 | Fung et al. | |
| 2011/0254687 A1 | 10/2011 | Arponen et al. | |
| 2012/0149338 A1 | 6/2012 | Roundtree | |
| 2012/0150601 A1 | 6/2012 | Fisher | |
| 2012/0184367 A1 | 7/2012 | Parrott et al. | |
| 2012/0196586 A1 | 8/2012 | Grigg et al. | |
| 2012/0238206 A1 | 9/2012 | Singh et al. | |
| 2012/0262281 A1 | 10/2012 | Edwards et al. | |
| 2013/0105565 A1 | 5/2013 | Kamprath | |
| 2013/0175984 A1 | 7/2013 | Yamazaki et al. | |
| 2014/0141718 A1 | 5/2014 | Stromberg et al. | |

OTHER PUBLICATIONS

Office Action dated Nov. 4, 2014, U.S. Appl. No. 14/076,164, filed Nov. 8, 2013.
Restriction Requirement dated Jan. 5, 2015, U.S. Appl. No. 13/857,139 filed Apr. 4, 2013.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Restriction Requirement dated Jul. 31, 2015, U.S. Appl. No. 13/873,813, filed Apr. 30, 2013.
Office Action dated Jul. 9, 2015, U.S. Appl. No. 14/732,846, filed Jun. 8, 2015.
Cordes, Kevin R., et al., "Visually Readable Electronic Label," filed Jun. 8, 2015, U.S. Appl. No. 14/732,846.
Office Action dated Nov. 19, 2015, U.S. Appl. No. 13/857,139, filed Apr. 4, 2013.
Office Action dated Nov. 2, 2015, U.S. Appl. No. 13/873,813, filed Apr. 30, 2013.
Notice of Allowance dated Oct. 29, 2015, U.S. Appl. No. 14/732,846, filed Jun. 8, 2015.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Cordes, Kevin R., et al., "Prevention of Inductive Coupling Between Components of a Mobile Communication Device ", filed Apr. 30, 2013, U.S. Appl. No. 13/873,813.
Cordes, Kevin R., et al., "Visually Readable Electronic Label", filed Nov. 8, 2013, U.S. Appl. No. 14/076,164.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Mar. 6, 2015, U.S. Appl. No. 14/076,164, filed Nov. 8, 2013.
Cordes, Kevin R., et al., entitled, "Virtual Private Network (VPN) Tunneling in a User Equipment (UE) Brokered by a Radio Frequency Identity (RFID) Chip Communicatively Coupled to the User Equipment," filed Apr. 27, 2015, U.S. Appl. No. 14/696,835.
Notice of Allowance dated Dec. 17, 2015, U.S. Appl. No. 13/857,141, filed on Apr. 4, 2013
FAIPP Pre-Interview Communication dated Dec. 30, 2015, U.S. Appl. No. 14/532,954, filed Nov. 4, 2014.
Cordes, Kevin R., et al., "Digest of Biographical Information for an Electronic Device with Static and Dynamic Portions," filed Mar. 14, 2016, U.S. Appl. No. 15/069,921.
Notice of Allowance dated Mar. 26, 2016, U.S. Appl. No. 13/857,139, filed Apr. 4, 2013.
Notice of Allowance dated Apr. 22, 2016, U.S. Appl. No. 13/873,813, filed Apr. 30, 2013.
Notice of Allowance dated Mar. 24, 2016, U.S. Appl. No. 14/532,954, filed Nov. 4, 2014.

* cited by examiner

AUTONOMOUS AUTHENTICATION OF A READER BY A RADIO FREQUENCY IDENTITY (RFID) DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) tags are small passive devices that typically store a small amount of data. RFID tags typically comprise a radio transceiver and an antenna. When an appropriate radio frequency field is present, the antenna of the RFID tag derives induced energy from that radio frequency field and the radio transceiver transmits the data that is stored. RFID tags, depending on their implementation and operational specification, may be very small. RFID tags may be adhered onto other objects and have been used for inventory control. An RFID reader or scanner device may emit the appropriate radio frequency field and read the information broadcasted by the RFID tag or RFID tags that are located in that RFID field.

SUMMARY

In an embodiment, a radio frequency identity (RFID) tag is disclosed. The RFID tag comprises a logic processor, a memory, wherein the memory stores private information about an object to which the RFID tag is one of coupled or adhered and stores public information, and a radio transceiver configured to receive a request for information from an RFID reader and to transmit a reply to the request for information. The RFID tag also comprises an application stored in the memory that, when executed by the logic processor parses a request for information from the RFID reader received by the radio transceiver and determines, based on parsing the request for information from the RFID reader, whether the RFID reader is authorized to receive the private information stored in the memory. When the RFID reader is determined to be authorized, the application reads the private information from the memory and sends the private information to the radio transceiver to transmit. When the RFID reader is determined to not be authorized, the application reads the public information and sends the public information to the radio transceiver to transmit and does not send the private information to the radio transceiver.

In an embodiment, a method of a radio frequency identity (RFID) tag authenticating a tag reader before transmitting information to the tag reader is disclosed. The method comprises receiving a request for information from a tag reader by an RFID tag, wherein the request comprises an authentication token and parsing the request to extract the authentication token from the request by an application executing on a logic processor of the RFID tag. The method also comprises analyzing the authentication token to determine if the tag reader is authorized to receive individual information stored in a memory of the RFID tag by the application. If the tag reader is determined by the application to be authorized to receive the individual information, the method comprises transmitting the individual information to the tag reader by a radio transceiver of the RFID tag. If the tag reader is determined by the application to not be authorized to receive the individual information, the method comprises transmitting one of a null value or a tag identity (TID) to the tag reader by the radio transceiver of the RFID tag.

In an embodiment, a method of using a radio frequency identity (RFID) tag electrically connected to a motherboard of a mobile communication device is disclosed. The method comprises receiving a request for information from a tag reader by an RFID tag and analyzing the request for information to determine, by an application executing on a logic processor of the RFID tag, if the tag reader is authorized to receive the information. If the tag reader is determined to be authorized by the application, the method further comprises transmitting the requested information to the tag reader by the RFID tag. If the tag reader is determined to be authorized by the application, the method further comprises presenting a prompt on a display of the mobile communication device to input a personal identification number (PIN), receiving an input to the mobile communication device, wherein the input comprises the PIN, and transmitting the PIN by a radio transceiver of the mobile communication device to a transaction server that is communicatively coupled to the tag reader, whereby a business transaction is completed based on a two factor authentication of the mobile communication device, where the two factors comprise the PIN and the requested information transmitted by the RFID tag to the tag reader.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
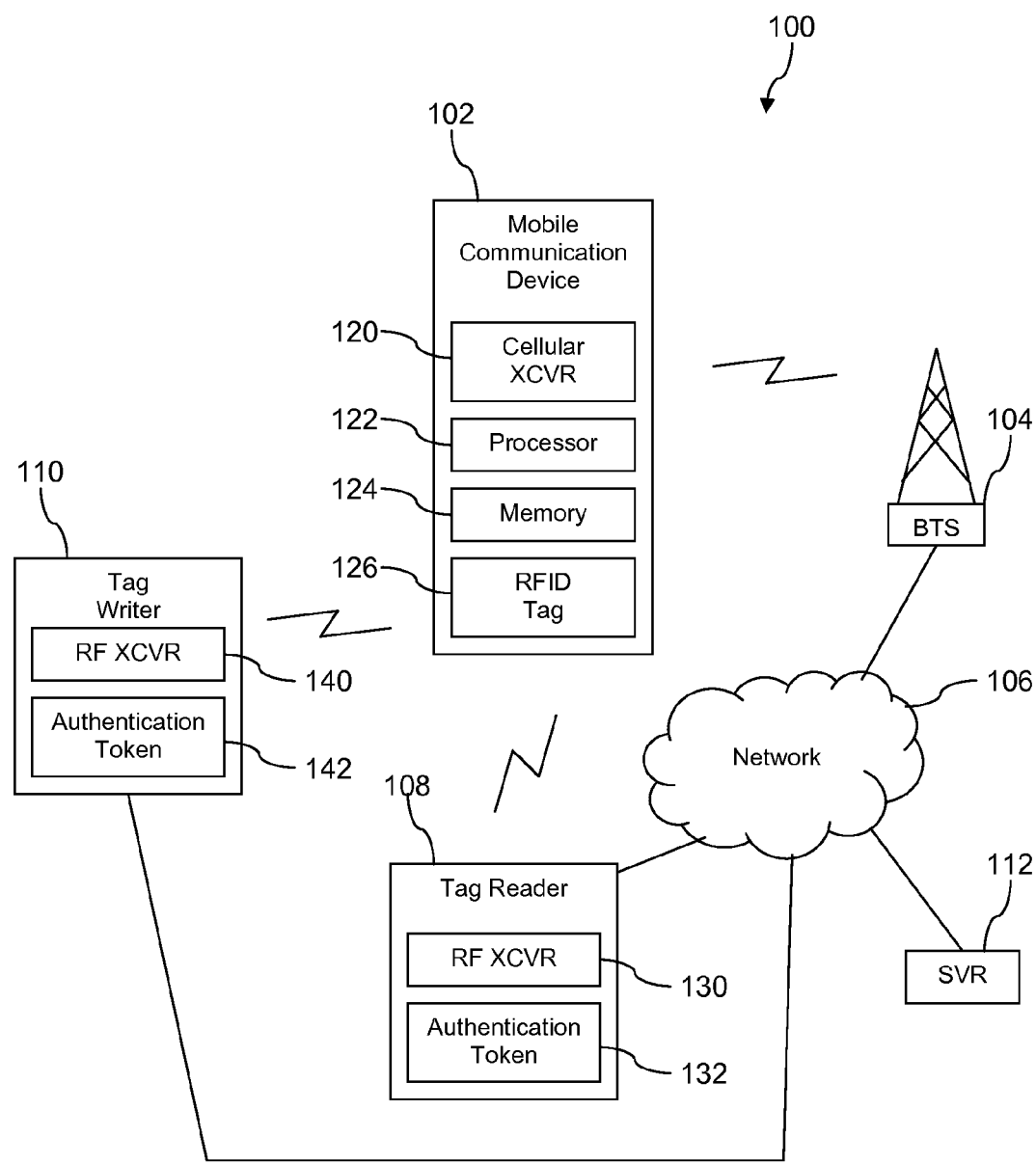
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a radio frequency identity (RFID) tag that comprises a logic processor that autonomously authenticates, by executing an authentication application, a tag reader that transmits a read request. For example, the logic processor may execute an authentication program or execute authentication logic in response to the RFID tag receiving a read request message from the tag reader. If the tag reader passes authentication, the RFID tag may transmit a first class of information to the tag reader. If the tag reader fails the authentication, the RFID tag may transmit a second class of information to the tag reader. The first class of information may be information that is fuller and/or more individualized to either the RFID tag or to a device or object with which the RFID tag is associated. Said in other words, the first class of information may be private information and/or sensitive information. The second class of information may be either null information or tag identification (TID) information (e.g., an identity of the RFID tag and/or an identity of the model of RFID tag). The second class of information may be public information and/or non-sensitive information. In some contexts, this may be referred to as both authenticating and authorizing the tag reader. For example, in some embodiments, when the tag reader is determined to be authenticated or passes authentication it is thereby deemed authorized to receive the private information.

In an embodiment, the RFID tag may respond to a read request message received from the tag reader by immediately beginning to transmit the second class of information, for example the TID, null information, or other public information. The RFID tag may continue to transmit this second class of information, for example transmitting a stream of data that repeats, so long as the RFID tag is energized by a radio frequency field and the authentication process has not completed. When the authentication process has completed, the RFID tag may then transmit the first class of information or the private information, provided the tag reader was authenticated and is authorized to receive the private information. When the authentication process has completed, the RFID tag may continue to transmit the second class of information or the public information if the tag reader fails authentication or is determined to not be authorized to receive the private information and as long as the RFID tag is energized by the radio frequency field.

The RFID tag may be adhered to or electrically coupled to an object or electronic device. For example the RFID tag may be adhered to the surface of an electronic communication device or captured under a control button of an electronic communication device. The RFID tag, alternatively, may be electrically and/or communicatively coupled to an electronic communication device, for example coupled to a data bus and/or control bus of a motherboard of the electronic communication device. For more details about an RFID tag coupled to a motherboard of a communication device, see U.S. patent application Ser. No. 13/857,139, filed Apr. 4, 2013, entitled "Radio Frequency Identity (RFID) Chip Electrically and Communicatively Coupled to Motherboard of Mobile Communication Device," by Kevin R. Cordes, et al., and U.S. patent application Ser. No. 13/857,138, filed Apr. 4, 2013, entitled "System for Managing a Digest of Biographical Information Stored in a Radio Frequency Identity Chip Coupled to a Mobile Communication Device," by Kevin R. Cordes, et al., both of which are incorporated by reference herein each in its entirety. The present disclosure contemplates that the electronic communication device may be any of a wide range of electronic communication devices, for example a mobile phone, a personal digital assistant, a media player, a laptop computer, a tablet computer, a notebook computer, a headset computer, a wearable computer, a television, a printer, a copier or copying machine, a refrigerator, and others.

The RFID tag may store a variety of information. In an embodiment, the RFID tag stores individual information related to the individual device to which it is adhered or electrically coupled to. In an embodiment, the RFID tag stores biographical information about the device to which it is associated. The biographical information may comprise a static information component that does not change after completion of manufacture of the device and a dynamic information component that may change after completion of device manufacture, for example as software updates are installed in the device. The static information component may identify a date and place of manufacture, an initial hardware version, an initial software version, and the like. The dynamic information component may identify a current hardware version, a current software version, a lifecycle phase or state, and other information. For more information about storing device biographic information in an RFID tag, see U.S. patent application Ser. No. 13/857,141, filed Apr. 4, 2013, entitled "Digest of Biographical Information for an Electronic Device with Static and Dynamic Portions," by Kevin R. Cordes, et al., which is incorporated by reference herein in its entirety.

The tag reader may transmit an authentication token as part of a request to the RFID tag to transmit its stored information. The authentication token may be unique to the specific tag reader, it may be associated with a category or class of tag readers, or it may be associated with a plurality of tag readers operated by an enterprise. The RFID tag may store one or more authentication codes corresponding to authentication tokens of tag readers to which the RFID tag is configured to transmit full information. When the RFID tag receives a request for information, it parses the request to determine the authentication token, it compares the authentication token to the one or more stored authentication codes, and if the authentication token matches one of the stored authentication codes, the RFID tag transmits the first class of information, the full set of stored information. If the authentication token does not match any of the stored authentication codes, the RFID tag may not reply and may not transmit any information. Alternatively, in this case the RFID tag may transmit null information or may transmit only a TID. This authenticated access to the full set of stored information can improve the preservation of confidentiality of the information, for example preventing inadvertent release of confidential information or malicious theft of confidential information. This layer of security may promote adoption of use of this new kind of RFID tag that stores more detailed information, more individualized information, more private information, and/or more sensitive information. This layer of security may further promote adoption of this new kind of RFID tag to grant a variety of levels of access to the more detailed information, for example a first level of access corresponding to access restricted to the second class of information, a second level of access corresponding to a portion of the first class of information, and a third level of access corresponding to all of the first class of information. In other embodiments, yet more levels of access may be supported by the RFID tag.

The tag reader may be associated with a transaction application, such as a rental car transaction application. When the tag reader transmits its authentication token, the RFID tag determines that the authentication token corresponds to a stored authentication code and further triggers communication between the RFID tag and a mobile communication device to which the RFID tag is adhered or coupled to. The mobile communication device launches an interface on its display and prompts a user to input a personal identification number (PIN). The input PIN is transmitted from the mobile communication device to the RFID tag, and the RFID tag transmits the PIN to the tag reader. The tag reader validates the PIN and when valid, completes a rental car transaction, for example releasing a rental car for use by the user of the mobile communication device.

Alternatively, the mobile communication device may transmit the PIN to a server application executed on a server computer managed by the rental car company. For example, a cellular radio transceiver of the mobile device transmits a message comprising the PIN to a base transceiver station, the base transceiver station transmits the message to a network, and the network transmits the message to the server. The server application parses the message to extract the PIN, validates the PIN, and sends a rental car transaction approval via the network to the tag reader or to the tag writer. The server application may validate the PIN to a registration account of the user and may further validate an identity of the mobile communication device, for example mobile communication device identification information also provided in the message sent by the cellular radio transceiver of the mobile communication device. This may be referred to in some contexts as two factor authentication. The server application may then communicate electronic key data to the mobile communication device, for example by sending the electronic key data to the tag writer, and by the tag writer writing the electronic key data to the RFID tag. Alternatively, the server application may communicate the electronic key data to the mobile communication device via the base transceiver station and the cellular radio transceiver.

The door locks of the rental car may be unlocked, with keys already positioned in the ignition of the rental car. Alternatively, a door unlock and engine start electronic key may be transmitted from the tag reader to the RFID tag, and the RFID tag may transmit the electronic key to open and start the rental car. Alternatively, the RFID tag may transmit the electronic key to the mobile communication device, and a radio transceiver of the mobile communication device may transmit the electronic key to open and start the rental car. When the rental car is returned, it is contemplated that a tag scanner may read rental car usage information from the RFID tag, after first authenticating itself as described above. The rental car pick-up and the rental car return may be automatically handled by the user "tapping" his or her mobile phone and RFID tag on an electronic station, electronic turnstile, or electronic kiosk entering and leaving the car rental lot.

While a rental car transaction is described above, it is understood that a wide variety of business transactions could also be supported with like processes by the RFID tag coupled to a mobile communication device. Some other use cases are described further hereinafter. Such automated authenticated transactions can streamline customer interactions and improve customer satisfaction. This kind of process may be reserved to incent return of customers in a loyalty program. Alternatively, this kind of process may be reserved to customers paying for a higher tier of service.

Turning now to FIG. 1, a system 100 is described. In an embodiment, system 100 comprises a mobile communication device 102, a base transceiver station 104, a network 106, and a tag reader 108. In some embodiments, the system 100 may further comprise a tag writer 110. In some embodiments, the system 100 may further comprise a server computer 112. As will be described further below, in an embodiment, the system 100 may not comprise the mobile communication device 102 or the base transceiver station 104 and may comprise a radio frequency identity (RFID) tag 126 coupled to or adhered to another kind of device, for example a printer, a copier, movie theater projection equipment, a television, a refrigerator, a gasoline pump, a hospital patient admission bracelet, a money bag, or other device. The system 100 may comprise any number of mobile communication devices 102, BTSs 104, tag readers 108, tag writers 110, and/or server computers 112.

In an embodiment, the mobile communication device 102 comprises a cellular radio transceiver 120, a processor 122, a memory 124, and the RFID tag 126. The mobile communication device 102 may be any of a mobile phone, a smart phone, a personal digital assistant, a media player, a laptop computer, a tablet computer, a notebook computer, a headset computer, or a wearable computer. The RFID tag 126 may be adhered to or captured under a button of the mobile communication device 102. The RFID tag 126 may be communicatively and/or electrically coupled to a motherboard of the mobile communication device 102, and the memory 124 may be directly accessible from a memory bus and/or control bus of the motherboard of the mobile communication device 102. For more details about an RFID tag coupled to a motherboard of a communication device, see U.S. patent application Ser. No. 13/857,139, filed Apr. 4, 2013, entitled "Radio Frequency Identity (RFID) Chip Electrically and Communicatively Coupled to Motherboard of Mobile Communication Device," by Kevin R. Cordes, et al., which was incorporated by reference above.

The network 106 may comprise one or more private networks, one or more public networks, and/or a combination thereof. The network 106 may promote communication among the BTS 104, the tag reader 108, the tag writer 110, and the server 112. The BTS 104 may provide a wireless communication link to the cellular radio transceiver 120 of the mobile communication device 102 to link the device 102 to the network 106. The BTS 104 may communicate with the mobile communication device 102 using any of a code division multiple access (CDMA) wireless communication protocol, a global system for mobile communication (GSM) wireless communication protocol, a long-term evolution (LTE) wireless communication protocol, a worldwide interoperability for microwave access (WiMAX) wireless communication protocol, or other wireless communication protocol. In an embodiment, the BTS 104 may be an enhanced Node B (eNB), for example when the BTS 104 communicates with the mobile communication device using an LTE wireless link.

The tag reader 108 may comprise a radio transceiver 130 and an authentication token 132. The authentication token 132 may be a string of symbols or may be a digital number. The radio frequency transceiver 130 may transmit a radio frequency field from which the RFID tag 126 may derive induced energy. In an embodiment, the RFID tag 126 may be a passive device and derive electrical power from an incident radio frequency field. In an embodiment, the RFID tag 126 may receive electrical power from a battery (not shown) in the mobile communication device 102 when the battery is charged and may derive electrical power from an incident radio frequency field when the battery is discharged or otherwise unavailable, for example if the mobile communication device 102 is powered off. The tag writer 110 may comprise a radio frequency transceiver 140 and an authentication token 142. The authentication token 142 may be a string of symbols or may be a digital number. The tag reader 108 and/or the tag writer 110 may transmit a radio frequency field from with the RFID tag 126 can derive electrical power.

The radio frequency transceiver 130 may further transmit a request for information that comprises the authentication token 132 to the RFID tag 126. In an embodiment, the tag reader 108 may be associated with an inventory control station or a handheld inventory control device, for example in a fulfillment center or in a retail store. Alternatively, the tag reader 108 may be associated with a variety of other devices. The tag reader 108 may be associated with a handheld tool that a nurse may use in a hospital to scan and retrieve information from a patient admission bracelet to which the RFID tag 126 may be adhered. In this case the first class of information or the individual information stored by the RFID tag 126 may comprise one or more of a patient treatment history, a patient treatment plan, a nurse patient visit history, a doctor patient visit history, a medication administration history, a patient diagnosis, a patient administration date, a patient hospital room number, a patient next-of-kin information, and other information.

The tag reader 108 may be associated with a handheld tool used by armored car operators to scan and retrieve chain of custody information from a money bag to which the RFID tag 126 is adhered or sewn into. In this case the first class of information or the individual information stored by the RFID tag 126 may comprise one or more of an identity of a depositor associated with the money bag, an identity of a bank to which the depositor intends the money bag to be delivered to, a cash amount contained within the money bag, a date on which the money bag is transferred into the hands of the armored car personnel, and other information. The tag reader 108 may be associated with a handheld tool that a maintenance technician uses to service equipment, for example a movie projector in a movie theater, a wide screen television in a private house, a gas pump at a convenience store, and other equipment. In this case the first class of information or the individual information stored by the RFID tag 126 may comprise one or more of a previous service call date, a code identifying one or more service functions performed during the previous service call, a subscription service configuration, a calibration record, error codes, and other information. In an embodiment, the equipment associated with the RFID tag 126 may be able to write the error codes to the RFID tag 126. It will be appreciated that yet other use cases are suitable for application of the teachings of the present disclosure, and the RFID tag 126 may store yet other kinds of individual information in different use cases.

While the tag reader 108 and the tag writer 110 are illustrated in FIG. 1 as separate devices, in an embodiment they may be combined within a single device, for example combined in a tag reader-writer device. A combined tag reader-writer device may be useful in some scenarios, for example in the service repairman scenario, where a serviceman may use a tag reader-writer to read previous service history from an RFID tag before beginning to work on a piece of equipment to which the tag is associated and then write an update to the service history to the RFID tag upon completing work on the equipment. Likewise, a nurse may use a tag reader-writer to read a patient treatment history and a treatment plan from an RFID tag associated with a patent admission bracelet before administering scheduled medication to the patent and then use the tag reader-writer to write an update to the patient treatment history on the RFID tag.

In an embodiment, the RFID tag 126 may grant different levels of access to tag readers 108, to tag writers 110, and/or to tag reader-writers based on an authentication token 132, 142 transmitted by the tag reader 108, the tag writer 110, or the tag reader-writer to the RFID tag. In some contexts, levels of access may be referred to as access privileges. For example, a first level of nurse may be granted access to read a treatment history and a treatment plan and to write an update to the treatment history of an RFID tag associated with a patient admission bracelet but may be prevented from reading from a history of doctor visits from the patient admission bracelet or from reading a home address of the patient. Thus, the tag reader 108 associated with a nurse may be authenticated, may be authorized to access some private information (e.g., nurse information), but may be unauthorized to access other private information (e.g., doctor information or hospital business office information).

Figure 2:
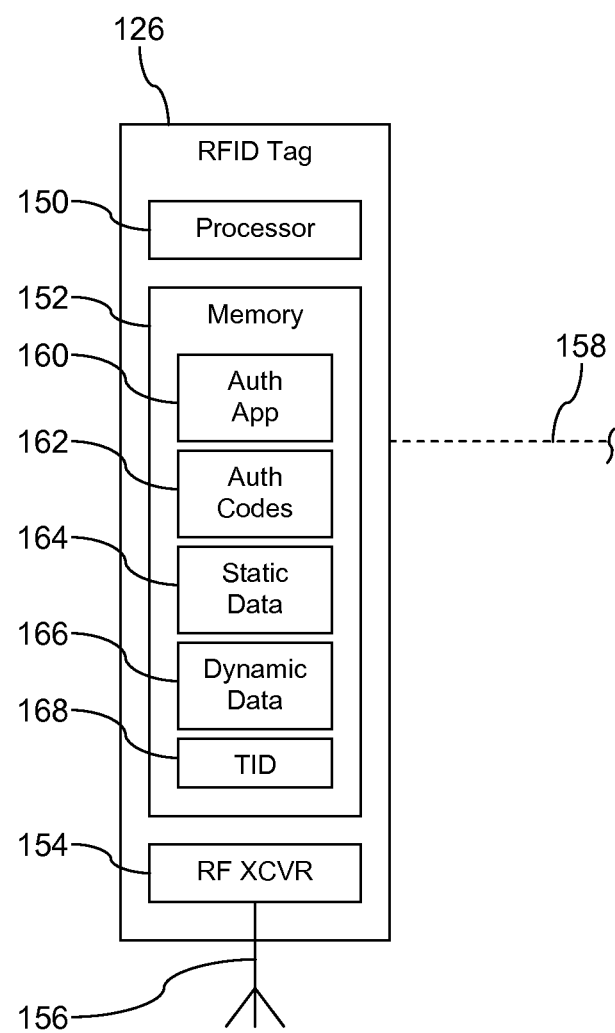
FIG. 2 is a block diagram of another communication system according to an embodiment of the disclosure.

When the RFID tag 126 receives a request for information from the tag reader 108, the RFID tag 126 may autonomously authenticate the tag reader 108 based on the authentication token 132 transmitted by the tag reader 108. Turning now to FIG. 2, further details of the RFID tag 126 are described. In an embodiment, the RFID tag 126 comprises a processor 150, a memory 152, a radio transceiver 154, and an antenna 156. The RFID tag 126 is configured to be operable in a passive mode of operation and/or an unpowered mode of operation, wherein the RFID tag 126 derives power from an externally generated and/or radiated radio frequency field. In an embodiment, the RFID tag 126 is configured to exclusively operate in a passive mode of operation. In another embodiment, the RFID tag 126 is configured as a dual-mode device, capable of operating in a first power mode based on electrical power received from the mobile communication device 102 (e.g., battery power) or from another device (e.g., battery power or power derived from alternating current mains power) and capable of operating in a second power mode based on deriving power from an externally generated and/or radiated radio frequency field.

In an embodiment, the antenna 156 may be internal to or integral with the RFID tag 126. In an embodiment, the antenna 156 may be external to the RFID tag 126, for example disposed within a package of the mobile communication device 102 and/or on a motherboard of the device 102. In an embodiment, the antenna 156 may be integrated with a ground plane of the motherboard of the mobile communication device 102. In the case that the antenna 156 is disposed externally to the RFID tag 126, the antenna 156 may be coupled to the RFID tag 126 by any of a variety of connection and/or coupling devices such as a radio frequency coupler.

The processor 150 may be a central processor unit (CPU), a microprocessor (MPU), a microcontroller (MCU), a digital signal processor (DSP), an application specific integrated circuit (ASIC), a programmable logic device (PLD), complex programmable logic device (CPLD), field programmable gate array (FPGA), and/or other semiconductor logic device. The processor 150 may be configured and/or manufactured to operate in two different power modes, a first power mode associated with power supplied from a battery power source of the mobile communication device 102 or power supplied from some other powered device (e.g., derived from battery power or derived from alternating current mains power), and a second power mode associated with power induced in the antenna 156 by a radio frequency field emitted by a tag reader 108 or a tag writer 110.

In an embodiment, the RFID tag 126 may be coupled to or connected to the motherboard of the mobile communication device 102, for example via coupling 158, and may receive battery power from the mobile communication device 102 when the battery is charged and when the mobile communication device 102 is turned on or powered on. This may be referred to as a first power mode of operation of the RFID tag 126. When the battery of the mobile communication device 102 is discharged and/or when the device 102 is turned off, the RFID tag 126 may operate in the second power mode, using power induced in the antenna 156 by a radio frequency field. The ability of the RFID tag 126 to operate using power induced in the antenna 156 may be useful when performing a troubleshooting diagnosis of the device 102 or when refurbishing the device 102.

When powered in the second power mode, the processor 150 may execute a restricted instruction set to conserve power consumption and/or may execute using a reduced clock rate. When powered in the second power mode, the processor 150 may sleep while energy builds in an energy storage device (not shown) in the RFID chip 126 such as a capacitor or an inductor, wake when energy storage in the energy storage device accumulates to a threshold, execute instructions until energy storage in the energy storage device drops below a low threshold, and then sleep again. The processor 150 may be designed to use other techniques to conserve and/or to use power derived from a radio frequency field by the antenna 156. The processor 150 may be manufactured to execute using an unrestricted instruction set and/or to execute using a higher speed clock rate when powered in the first power mode, for example when powered by a battery.

In an embodiment, the RFID tag 126 is not coupled or connected to the mobile communication device 102 and does not operate in the first power mode and does not receive battery power or power derived from the alternating current mains under any circumstances. The RFID tag 126 may be configured and/or designed to operate solely from the power derived from an externally generated and/or radiated radio frequency signal, to operate solely in the second power mode.

In an embodiment, the memory 152 stores an authentication application 160, one or more authentication codes 162, static data 164, dynamic data 166, and a tag identity (TID) 168. In some contexts, the static data 164 and the dynamic data 166 may be referred to as biographic data and/or biographical information. In another embodiment, however, the memory 152 may comprise other data. For example, instead of the static data 164 and the dynamic data 166, the memory 152 may store a first class of information that is associated with particular details of the mobile communication device 102 or of another object to which the RFID tag 126 is coupled, wherein the first class of information is not categorized as static and dynamic data. In some contexts, the first class of information may be referred to as individual information. Individual information may be associated with a history or succession of states experienced by the specific or individual RFID tag 126 and/or the object which the RFID tag 126 is associated with, for example the mobile communication device 102, a television, a patient admission bracelet, and the like.

The TID 168 may identify a manufacturer and/or model of the RFID tag 126 and hence may not be unique to an individual RFID tag 126. The TID 168 may identify a serial number of the individual RFID tag 126. As used herein, the TID 168 is not considered to be individual information. While a serial number may be unique or pseudo-unique to an individual RFID tag 126, it is not unique or indicative of a history of or succession of states that the RFID tag 126 or the object to which the RFID tag 126 is associated has passed through. In some contexts, the TID 168 may be referred to as a second class of information.

In an embodiment, the memory 152 may not store an authentication application 160, and instead the software, firmware, instructions, and/or logic may be stored within the processor 150, for example stored in the form of a configured state of the processor 150. As an example, it may be said that an application specific integrated circuit (ASIC) may have gates built into its semiconductor matrix that embodies the program or logic that provides the authentication functionality. In an embodiment, the memory 152 may further store rules written to it by the mobile communication device 102. The processor 150 may authenticate a tag reader 108 or tag writer 110 at least in part based on these rules. The rules may be parsed and acted upon by the authentication application 160 and/or software, firmware, instructions, and/or logic stored within the processor 150. In an embodiment, the rules may be used to complement or extend the authentication codes 162, for example to map authentication codes to levels of access or portions of individual information that may be transmitted.

In an embodiment, the radio transceiver 154 may transmit and receive radio signals in the ultra-high frequency (UHF) frequency band, for example from about 900 MHz to about 930 MHz. In some applications of the RFID tag 126, communication between the RFID tag 126 and the tag reader 108 using the UHF frequency band may promote read operations at distances of several meters, which may be advantageous in some applications such as inventory control in a fulfillment center. In another embodiment, the radio transceiver The authentication codes 162 may be strings of symbols or may be digital numbers. The authentication codes 162 may be written into the memory 152 by the tag writer 110 and/or by the mobile communication device 102, for example via a coupler 158 that connects the communication line from the RFID tag 126 to the motherboard of the mobile communication device 102. The authentication codes 102 may be compared to the authentication token 132 transmitted by the tag reader 108 to authenticate the tag reader 108. For example, the authentication application 160 may be executed by the processor 150. The authentication application 160 may parse the request for information transmitted by the tag reader 108 to isolate and/or extract the authentication token 132. The authentication application 160 may then compare the extracted authentication token 132 to the stored authentication codes 162.

If a match is found, the authentication application 160 deems the tag reader 108 authenticated and enables transmitting the static data 164 and the dynamic data 166 by the radio transceiver 154 to the tag reader 108. Alternatively, the authentication application 160 may enable transmitting other information, for example the first class of information that contains details related to the mobile communication device 102 or related to an object with which the RFID tag 126 is associated. In an embodiment, the authentication tokens 132 may map to different levels of access to the information stored in the memory 152, for example a doctor authentication token 132 may map to a doctor level of access to information stored in an RFID tag 126 associated with a patient admission bracelet, a nurse authentication token 132 may map to a nurse level of access to information stored in the RFID tag 126, and a business office authentication token 132 may map to a business office level of access to information stored in the RFID tag 126. In this case, information may be transmitted by the RFID tag 126 to the tag reader 108 that is deemed accessible to the subject access level.

In an embodiment, the information that is transmitted by the RFID tag 126 may be encrypted by the processor 150 before it is transmitted. The tag reader 108 may decrypt the information received before processing the information. Alternatively, the tag reader 108 may not decrypt the information and instead may forward the information on to another system, for example to a computer system that executes an application that decrypts the information. Encrypting the information may prevent any other tag readers 108 in the vicinity from overhearing the transmission and using the information that may not have been intended for that tag reader.

If a match is not found, the authentication application 160 deems the tag reader 108 unauthenticated and disables transmitting the first class of information, the individual information, and/or the static data 164 and the dynamic data 166 to the radio transceiver. In this case, the radio transceiver 154 may not transmit anything, may remain mute. Alternatively, the radio transceiver 154 may transmit null data, for example mere digital gibberish, such as alternating 1s and 0s. Alternatively, the radio transceiver 154 may transmit the TID 168 to the tag reader 108. This may be referred to as transmitting a second class of information to the tag reader 108, that is a class of information that does not contain details relating to the mobile communication device 102 or to an object with which the RFID tag 126 is associated.

The RFID tag 126 may also compare the authentication token 142 transmitted by the tag writer 110 against the authentication codes 162. If a match is found between the transmitted authentication token 142 and one of the authentication codes 162, the tag writer 110 may be allowed to write to the RFID tag 126. As with reading from the information stored in the RFID tag 126, the authentication application 160 may map different authentication tokens 142 to different levels of write access for the tag writer 110. For example, a nurse authentication token 142 may permit a nurse to use the tag writer 110 to update information in the treatment history and nurse visit history but not the treatment plan. A doctor authentication token 142 may permit a doctor to use the tag writer 110 to update information in the treatment history, in a doctor visit history, and in the treatment plan but not update information in the nurse history. It is understood that the processor 150 and/or the processor executing instructions of the authentication application 160 that grants or restricts write access to the tag writer 110. If no match is found between the transmitted authentication token 142 and the authentication codes 162, the RFID tag 126 does not grant any write access to the information stored in the RFID tag 126.

The tag writer 110 may also read information from the RFID tag 126, if the tag writer 110 is authenticated by the RFID tag 126. For example, the tag writer 110 may read information before writing the information to the RFID tag 126. The tag writer 110 may be used to write to the RFID tag 126 in a manufacturing environment, for example to write into the static data 164. In an embodiment, after the tag writer 110 has written to the RFID tag 126, the tag writer 110 may command that write control lines and/or write enable lines of the RFID tag 126 be permanently disabled to prevent any future writing to any portion of the memory 152 of the RFID tag 126 or to disable future writing to specific areas of the memory 152 of the RFID tag 126, for example to disable future writing to the static data 164. The tag writer 110 may be used to write to the RFID tag 126 coupled to a money bag at a business office before handing off the money bag to an armored car service. The tag writer 110 may be used to write to the RFID tag 126 in a rental car environment, for example to write electronic rental car access codes or tokens to the RFID tag 126 when a rental car is picked up or to write null car access codes or tokens to the RFID tag 126 (overwriting previously valid codes or tokens) to the RFID tag 126 when the rental car is returned.

Figure 3:
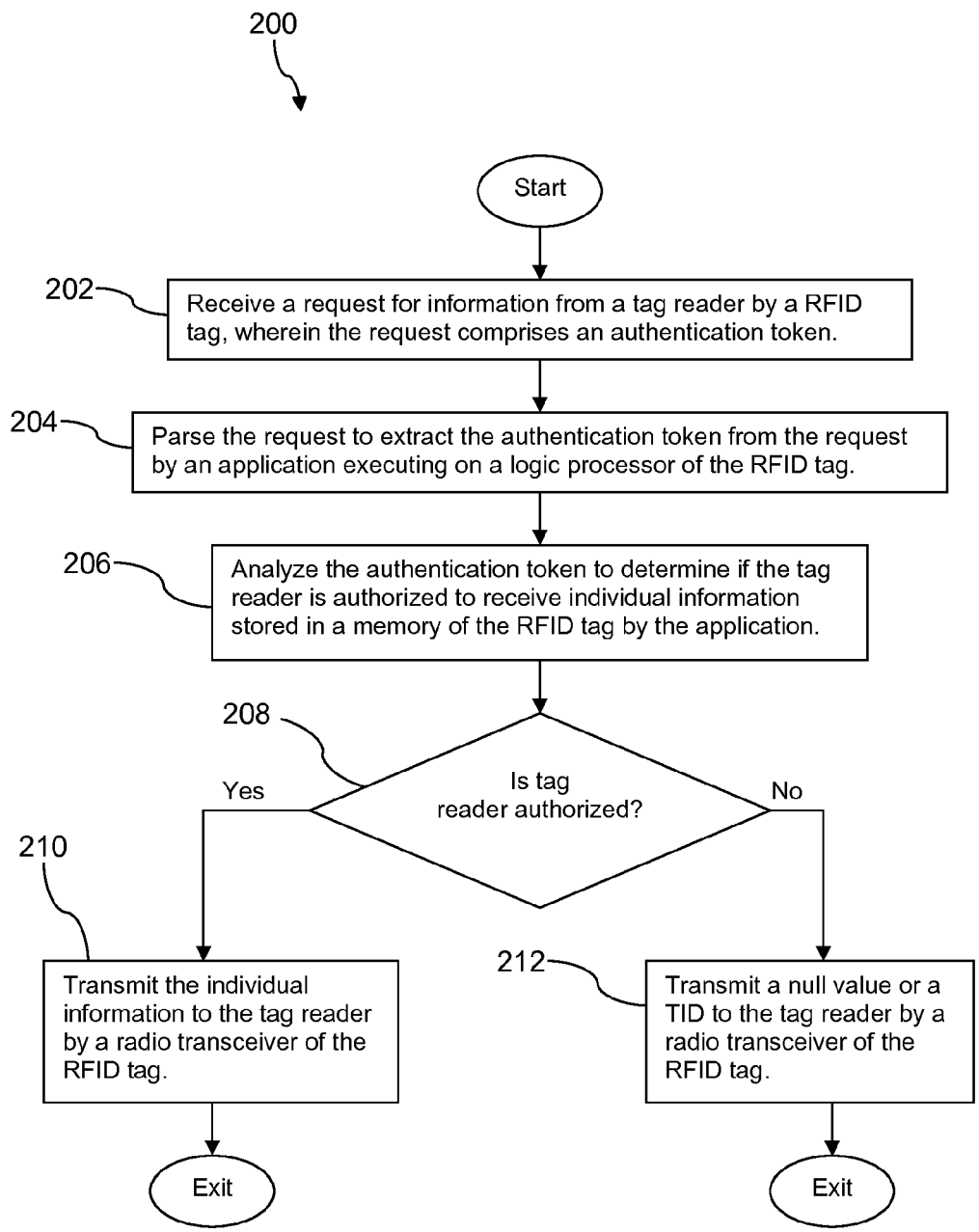
FIG. 3 is a flow chart of a method according to an embodiment of the disclosure.

Turning now to FIG. 3, a method 200 is described. At block 202, a request for information from a tag reader is received by an RFID tag, wherein the request comprises an authentication token. For example, the tag reader 108 sends a request for information comprising the authentication token 132 to the RFID tag 126. At block 204, an application, software, firmware, or gate logic that executes on a logic processor of the RFID tag parses the request to extract the authentication token. For example, the processor 150 of the RFID tag 126 executes logic that parses the request and extracts the authentication token 132.

At block 206, the application, software, firmware, or gate logic that executes on the logic processor of the RFID tag analyzes the authentication token to determine if the tag reader is authorized to receive individual information stored in a memory of the RFID tag by the application. For example, the processor 150 of the RFID tag 126 executes logic that determines if the authentication token is among the authentication codes 162 stored in the memory 152 of the RFID tag 126. If the processor 150 identifies a match between the authentication token 132 and one of the authentication codes 162, the processor 150 may deem the tag reader 108 authenticated. The individual information may be referred to as a first class of information. The individual information may comprise the static data 164 and/or the dynamic data 166. The individual information may comprise one or more of a patient treatment history, a patient treatment plan, a nurse patient visit history, a doctor patient visit history, a medication administration history, a patient diagnosis, a patient administration date, a patient hospital room number, a patient next-of-kin information, for example with the RFID tag is coupled to a patient admission bracelet. The individual information may comprise other information in other use cases.

At block 208, if the tag reader is authorized (e.g., if the authentication token encapsulated in the request for information transmitted by the tag reader 108 matches a authentication code stored in the RFID tag 126), at block 210, the individual information is transmitted to the tag reader by a radio transceiver of the RFID tag. For example, the radio frequency transceiver 154 transmits the individual information to the tag reader 108. For example, the radio frequency transceiver 154 transmits the static data 164 and the dynamic data 166. For example, the radio frequency transceiver 154 transmits the patient treatment history, the patient treatment plan, the nurse patient visit history, the doctor patient visit history, the medication administration history, the patient diagnosis, the patient administration date, the patient hospital room number, and the patient next-of-kin information. Alternatively, the RFID tag 126 and/or the radio frequency transceiver 154 may transmit selected portions of the individual information, for example different grades of information corresponding to a grade of access associated with the authentication token encapsulated in the request message.

At block 208, if the tag reader is not authorized (e.g., if the authentication token encapsulated in the request for information transmitted by the tag reader 108 does not match a authentication code stored in the RFID tag 126), at block 212 the radio frequency transceiver 154 does not transmit any signal, transmits a null signal, or transmits the TID 168 to the tag reader 108. If the tag reader 108 is not authorized, the radio frequency transceiver 154 and/or the RFID tag 126 does not transmit individual information.

Figure 4:
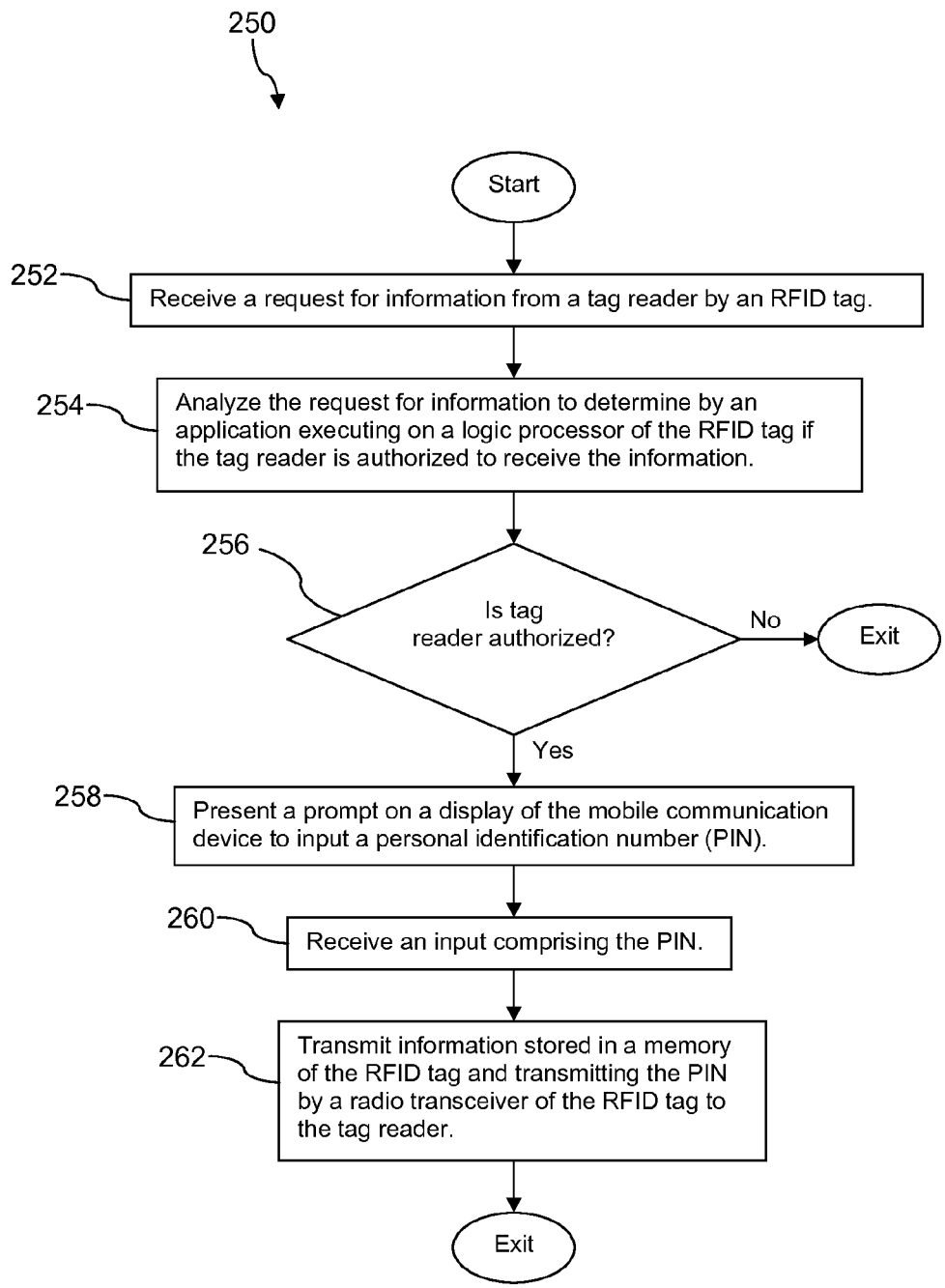
FIG. 4 is flow chart of another method according to an embodiment of the disclosure.

Turning now to FIG. 4, a method 250 is described. At block 252, a request for information is received from a tag reader by an RFID tag. At block 254, instructions executing in a logic processor of the RFID tag analyze the request to determine if the tag reader is authorized to receive the information. In an embodiment, this analysis may comprise comparing an authentication token or a code encapsulated in the request for information to one or more authentication codes stored in the RFID tag. If a match is found, the tag reader is deemed authorized and/or authenticated to receive the information; if no match is found, the tag reader is deemed not authorized and not authenticated to receive the information. At block 256, if the tag reader is not authorized, the method exits. The RFID tag may transmit public information to the tag reader, for example the TID 168. Alternatively and/or in addition, the RFID tag may transmit null information or remain mute.

At block 256, if the tag reader is authorized, the method proceeds to block 258. At block 258, a prompt is presented on a display of a mobile communication device to which the RFID tag is associated. The prompt asks a user to input a personal identification number (PIN). At block 260, the input comprising the PIN is received, for example received by the mobile communication device 102. A user of the mobile communication device 102 may enter inputs using a keypad or using a touch screen of the device. At block 262, information stored in the memory of the RFID tag is as well as the PIN are transmitted to the tag reader. In an embodiment, the information transmitted to the tag reader may comprise an identity of a car driver and a payment account.

Alternatively, information stored in the memory of the RFID tag is transmitted to the tag reader but not the PIN. In this case, the PIN may instead be transmitted by the cellular radio transceiver 120 of the mobile communication device 102 to the server computer 112, for example a transaction server, via the base transceiver station 104 and the network 106. The server computer 112 (e.g., a transaction server) may be said to be communicatively coupled to the tag reader 108 and/or the tag writer 110 via the network 106. In this case the server computer 112 may validate the PIN, and if the PIN is validated, the server computer 112 may send information, such as a transaction approval, to the tag reader 108. Alternatively, the server computer 112 may send the PIN to the tag reader 108, and the tag reader 108 may approve the transaction based on the PIN received from the server computer 112 and based on the information received from the RFID tag 126.

The mobile communication device 102 may also send other information along with the PIN to the server computer 112, for example a telephone number and/or an equipment identification number or serial number of the mobile communication device 102. The server computer 112 may complete a two factor authentication of the mobile communication device 102 based on the PIN and based on the other information (e.g., the phone number and/or equipment identification number or serial number). Alternatively, the tag reader 108 may send the information received from the RFID tag 126 to the server computer 112, and the server computer 112 may complete a two factor authentication of the mobile communication device 102 based on the PIN received via the BTS 104 and via the cellular radio transceiver 120 of the mobile communication device 102 and based on the information received from the tag reader 108 that was transmitted to the tag reader 108 by the RFID tag 126.

The tag reader 108 may be associated with a rental car system, and the information stored in the RFID tag memory as well as the PIN may complete a two factor authentication of the RFID tag 126, the mobile communication device 102 to which the RFID tag is associated, and/or a user of the mobile communication device 102. The user of the mobile communication device 102 may have a user account or registered membership with the rental car company. Alternatively, the user of the mobile communication device 102 may have no long term relationship with the rental car company but may simply have engaged in a one-time rental agreement with the rental car company. In either case, the rental car company may provide a personal identification number (PIN) to the user, and it may be this PIN that is received by the mobile communication device 102 in block 260 above. The information stored in the memory of the RFID tag 126 that is transmitted along with the PIN in block 262 may be information identifying the mobile communication device 102, identifying the user, or other information, for example a rental car agreement code input by the user into the mobile communication device and in turn transmitted to and stored in the RFID tag 126.

Alternatively, the mobile communication device 102 may transmit the PIN and optionally information identifying the mobile communication device 102 and/or the subscriber via the base transceiver station 104 to the server computer 112 operated by the rental car company. An application executing on the server computer 112 may validate the transaction using a two factor authentication process—using the PIN number entered by the user as a first authentication factor and using the information identifying the mobile communication device 102. Part of validating the transaction by the server computer 112 may comprise matching the subscriber and/or the mobile communication device 102 to a previously made reservation for a rental car.

When the two factor authentication completes, a tag writer may write access codes to the RFID tag that allow unlocking, starting, and operating rental car. For example, the tag writer 110 may write the access codes to the RFID tag 126. The RFID tag 126 may in turn write the access codes to the memory 124 of the mobile communication device 102. The access codes may be transmitted to the rental car to open and start the car via the RFID tag 126, for example as part of an information exchange with a tag reader 108 that is integrated with the rental car. Alternatively the access codes may be transmitted to the rental car to open and start the car by a near field communication (NFC) radio transceiver (not shown) of the mobile communication device 102, for example an NFC radio transceiver that serves as a proxy for a key fob. The NFC radio transceiver may retrieve the access codes from the memory 124 of the mobile communication device 102.

The two factor authentication and access code transfer interchange may take place as a brief tapping of the mobile communication device 102 on a kiosk at an airport, for example in front of the rental car company's counter. Alternatively, the kiosk may supplant the rental car company's counter and may simply be located at the edge of the car lot where the rental cars are parked. When the user returns the car to the rental car parking lot, the rental car may transfer and/or write rental car usage information (fuel level, miles driven, tolls incurred, excess speed information) to the RFID tag 126. When walking off the rental car parking lot, the mobile communication device 102 may be tapped on a kiosk. The tag reader 108 may perform a two factor authentication as above, retrieve the car usage information. The tag reader 108 may further read information about a payment account and/or a driver identity. Additionally, the tag writer 110 (or a combined reader-writer device) may overwrite the access codes stored in the RFID tag 126. The RFID tag 126 may cause the access codes stored in the memory 124 of the mobile communication device 102 to be overwritten in turn. In an embodiment, the kiosk may comprise both the tag reader 108 and the tag writer 110. In an embodiment, the kiosk may comprise an integrated tag reader-writer. It is understood that the RFID tag 126 may be used for a wide variety of such authenticated payment transactions. In an embodiment, the transactions described above as being performed by a tag reader and a tag writer may be performed by a tag reader-writer device.

Figure 5:
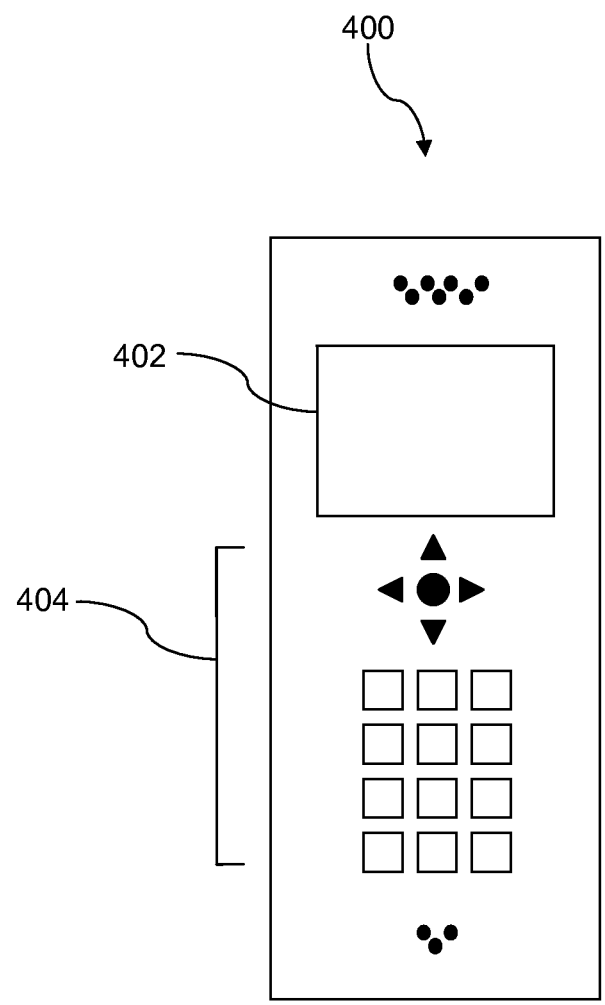
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
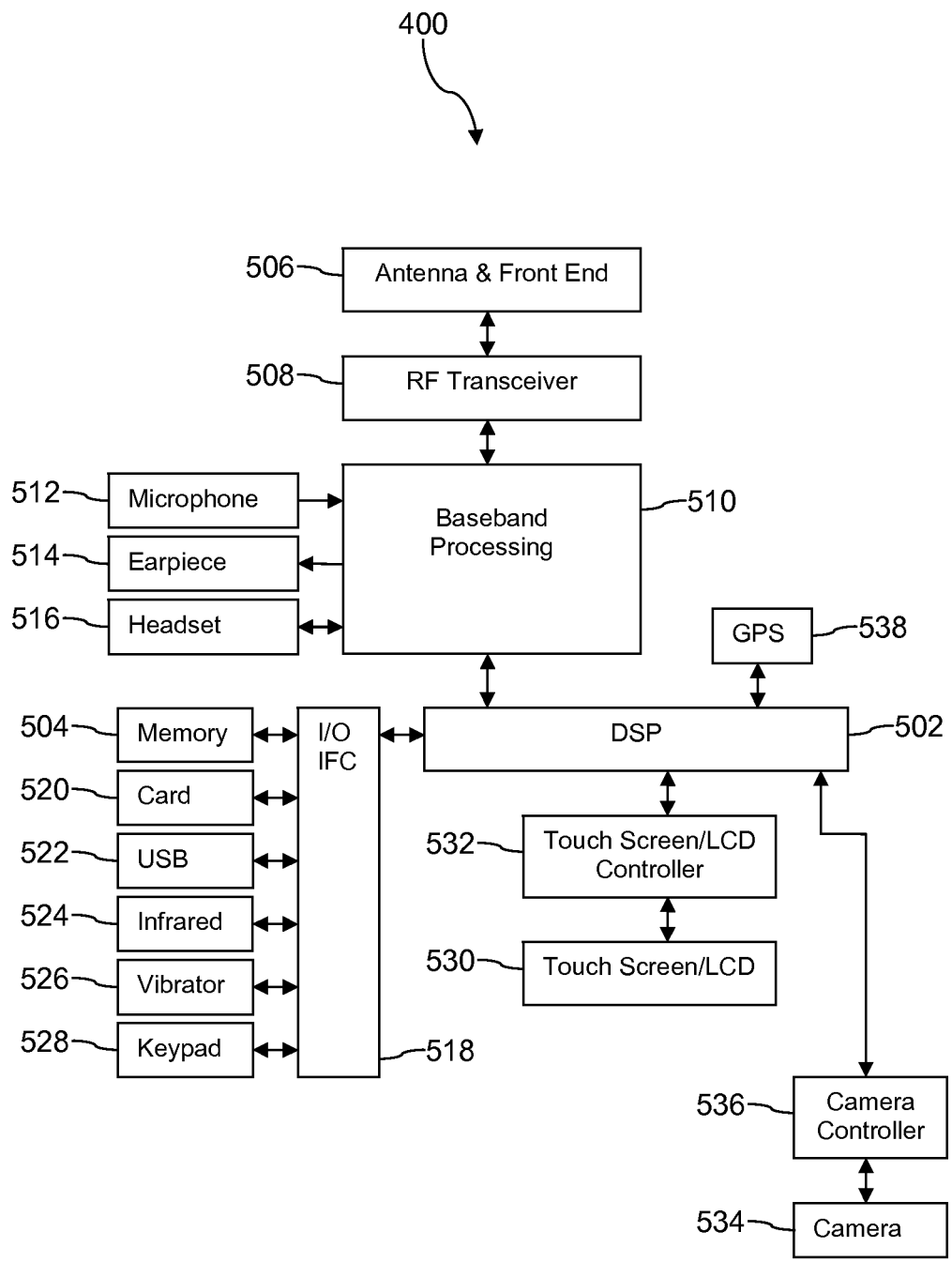
FIG. 6 is an illustration of a hardware architecture of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
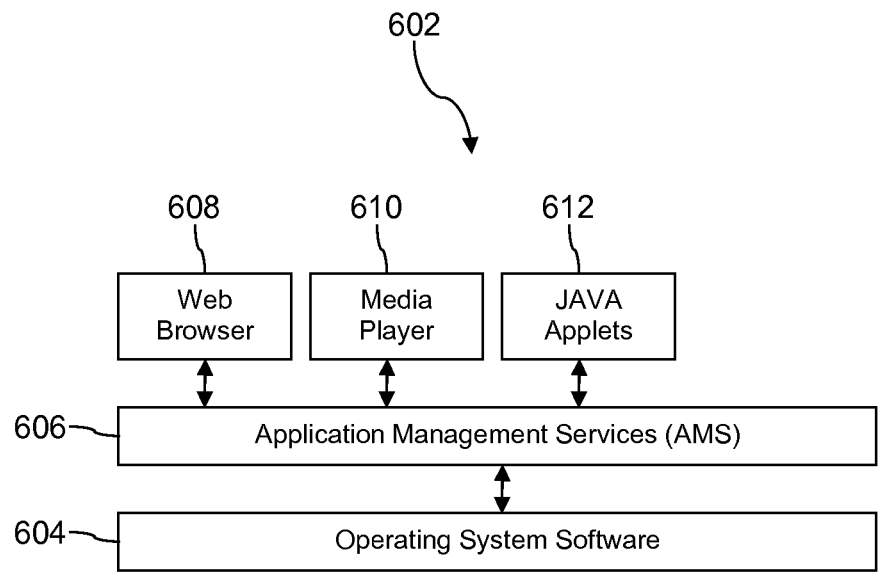
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
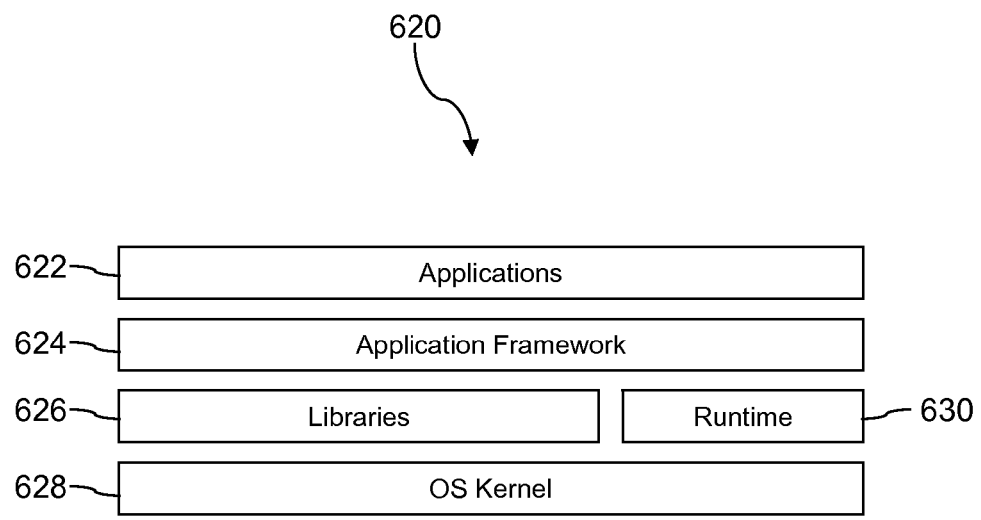
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
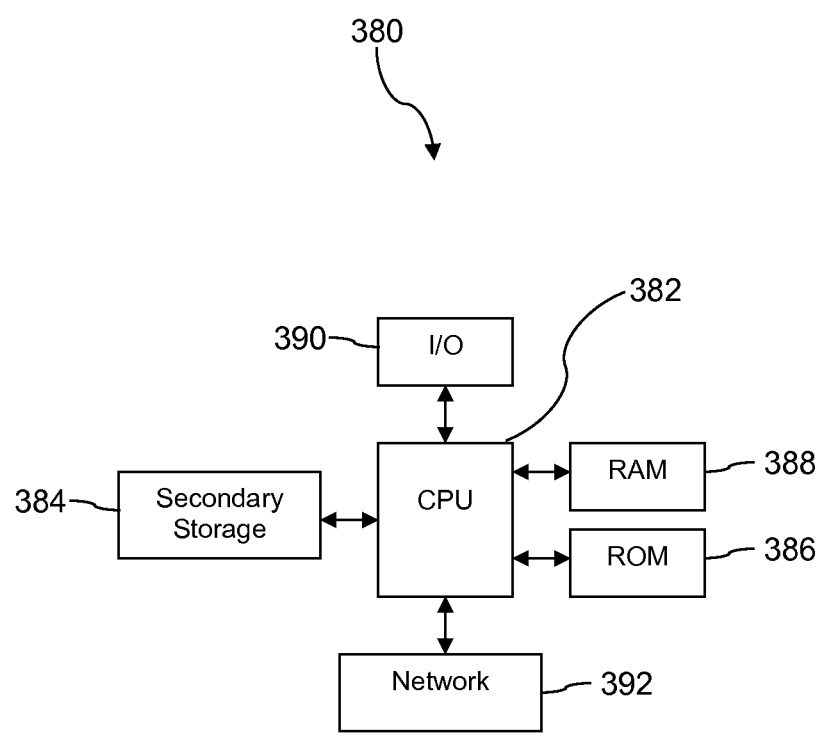
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of a radio frequency identity (RFID) tag authenticating a tag reader before transmitting information to the tag reader, comprising:

receiving, by an RFID tag coupled or adhered to an object, a request signal for information from a tag reader, wherein the request signal comprises an authentication token;

parsing, by an application executing on a logic processor of the RFID tag, the request signal to extract the authentication token from the request signal;

analyzing, by the application on the RFID tag, the authentication token to determine whether the tag reader is authorized to receive biographical information about the object that is stored in a memory of the RFID tag by comparing the authentication token to a plurality of different authentication codes stored in the memory of the RFID tag corresponding to a plurality of authentication tokens of tag readers to which the RFID tag is configured to transmit the biographical information, wherein the biographical information comprises static information about an initial state of the object and dynamic information about a current state of the object;

determining, by the application on the RFID tag, whether the tag reader is authorized to receive the biographical information based on the comparison, wherein the tag reader is authorized to receive the biographical information when the authentication token matches one of the plurality of different authentication codes stored in the memory of the RFID tag;

in response to a determination by the application on the RFID tag that the tag reader is authorized, transmitting, by a radio transceiver of the RFID tag, the biographical information to the tag reader; and in response to a determination by the application on the RFID tag that the tag reader is not authorized to receive the biographical information, transmitting, by the radio transceiver of the RFID tag, one of a null value or a tag identity (TID) to the tag reader.

2. The method of claim 1, further comprising:
receiving, by a second tag reader, a request signal to write to the RFID tag;
parsing, by the application on the RFID tag, the request signal to write to the RFID tag;
analyzing, by the application on the RFID tag, the request signal to write to the RFID tag to determine if the second tag reader is authorized to write to the RFID tag;
determining, by the application on the RFID tag, whether the second tag reader is authorized to write to the RFID tag; and
in response to a determination by the application on the RFID tag that the second tag reader is authorized to write to the RFID tag, writing updated information received from the second tag reader to the memory of the RFID tag.

3. The method of claim 2, further comprising, after the updated information is written to the memory of the RFID tag by the second tag reader, destroying at least some write control lines of the memory of the RFID tag.

4. The method of claim 1, wherein the plurality of different authentication codes correspond to a plurality of different types of tag readers.

5. The method of claim 4, wherein the plurality of different authentication codes are associated with different access privileges to access the biographical information stored in the memory of the RFID tag.

6. The method of claim 4, further comprising receiving additional authentication codes and identification of corresponding information access associated with each of the additional authentication codes from an electronic device which the RFID tag is communicatively coupled to.

7. The method of claim 1, wherein the object to which the RFID tag is coupled or adhered comprises one of a mobile phone, a personal digital assistant (PDA), a media player, a laptop computer, a tablet computer, a notebook computer, a television, a printer, a copier, or a refrigerator.

8. The method of claim 1, wherein the biographical information comprises at least one of error codes associated with the object to which the RFID tag is coupled or adhered or a date of prior service performed on the object to which the RFID tag is coupled or adhered.

9. The method of claim 1, wherein the biographical information is encrypted before it is transmitted by the radio transceiver to the tag reader.

10. The method of claim 1, further comprising:
in response to receiving the request signal, transmitting, by the RFID tag, the one of the null value or the TID to the reader while the RFID tag completes the parsing, the analyzing, and the determining, wherein the RFID tag continues to transmit the one of the null value or the TID to the tag reader in response to the determination by the application on the RFID tag that the tag reader is not authorized to receive the biographical information.

11. A radio frequency identity (RFID) tag, comprising:
a logic processor;
a memory, wherein the memory comprises biographical information about an object to which the RFID tag is one of coupled or adhered and a plurality of authentication codes corresponding to a plurality of authentication tokens of tag readers to which the RFID tag is configured to transmit the biographical information, and wherein the biographical information comprises static information about an initial state of the object and dynamic information about a current state of the object;
a radio transceiver configured to receive a request signal for the biographical information from an RFID reader and to transmit a reply to the request signal for the biographical information; and
an application stored in the memory of the RFID tag that, when executed by the logic processor:
parses a request signal from a tag reader to extract an authentication token from the request signal,
analyze the authentication token to determine whether the tag reader is authorized to receive biographical information stored in the memory of the RFID tag by comparing the authentication token to the plurality of different authentication codes stored in the memory of the RFID tag,
determine whether the tag reader is authorized to receive the biographical information based on the comparison, wherein the tag reader is authorized to receive the biographical information when the authentication token matches one of the plurality of different authentication codes stored in the memory of the RFID tag,
in response to a determination that the tag reader is authorized, reads the biographical information from the memory and sends the biographical information to the radio transceiver to transmit to the tag reader, and
in response to a determination that the tag reader is not authorized to receive the biographical information, reads one of a null value or a tag identity (TID) and sends the one of the null value or the TID to the radio transceiver to transmit to the tag reader.

12. The RFID tag of claim 11, wherein the biographical information comprises at least one of error codes associated with the object to which the RFID tag is coupled or adhered or a date of prior service performed on the object to which the RFID tag is coupled or adhered.

13. The RFID tag of claim 11, wherein the biographical information is encrypted before it is sent to the radio transceiver to transmit to the tag reader.

14. The RFID tag of claim 11, wherein the object to which the RFID tag is coupled or adhered comprises one of a mobile phone, a personal digital assistant (PDA), a media player, a laptop computer, a notebook computer, a tablet computer, a wearable computer, a headset computer, a television, a copying machine, a printer, and a refrigerator.

15. The RFID tag of claim 11, wherein the plurality of different authentication codes correspond to a plurality of different types of tag readers.

16. The RFID tag of claim 15, wherein the plurality of different authentication codes are associated with different access privileges to access the biographical information stored in the memory of the RFID tag.

* * * * *